United States Patent Office 3,523,738
Patented Aug. 11, 1970

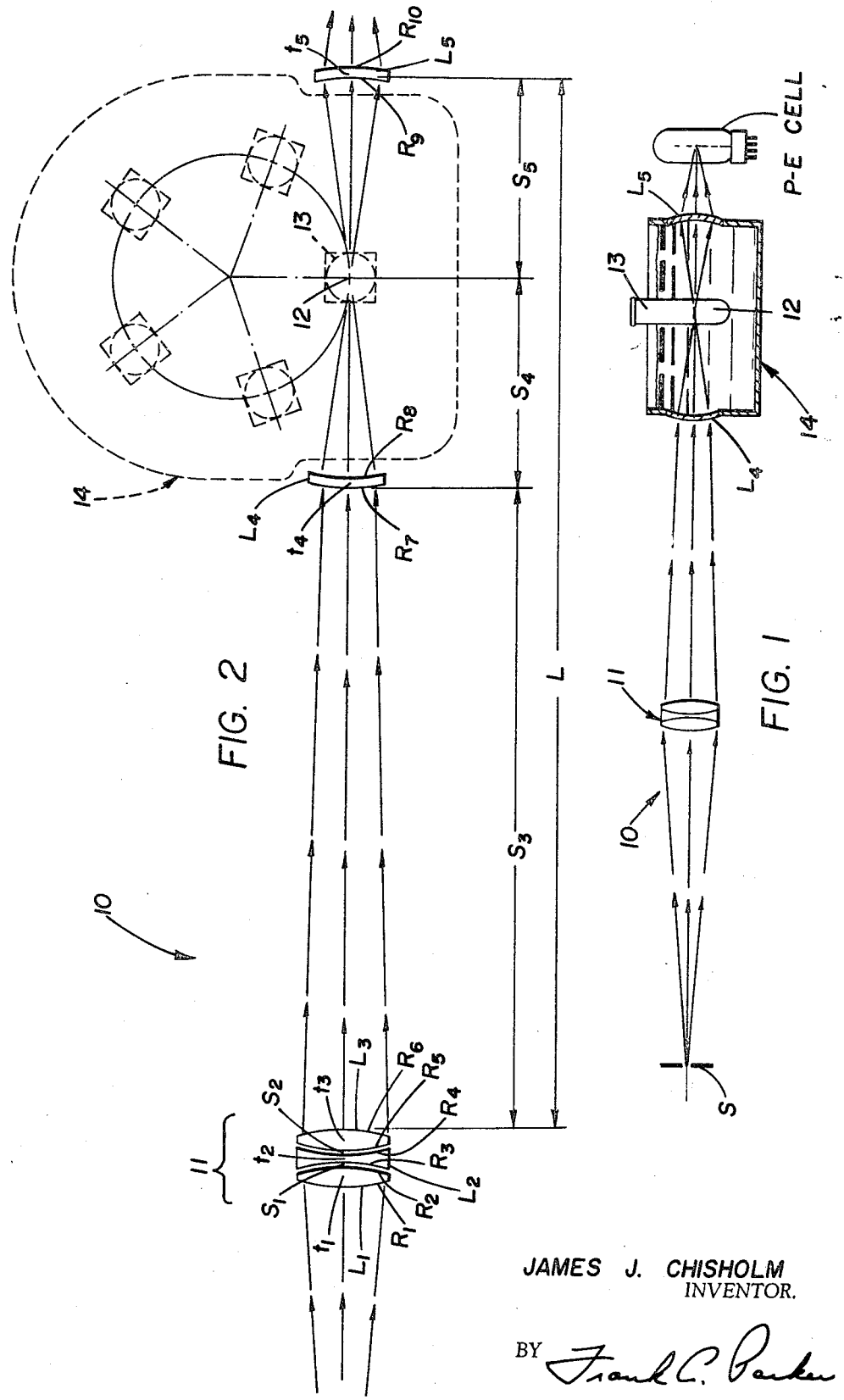

3,523,738
LENS SYSTEM FOR THE SAMPLE COMPARTMENT OF SPECTROPHOTOMETERS, COLORIMETERS AND THE LIKE
James J. Chisholm, Rochester, N.Y., assignor to Bausch & Lomb Incorporated, Rochester, N.Y., a corporation of New York
Filed Apr. 23, 1968, Ser. No. 723,385
Int. Cl. G01b 9/34; G01n 21/22
U.S. Cl. 356—201                                6 Claims

ABSTRACT OF THE DISCLOSURE

A special lens system designed for individual or multiple sampling for a spectrophotometer of the type wherein according to one form of the invention a plurality of test tube samples are placed in a sampling accessory for successive sampling by the spectrophotometer, colorimeter or the like. The system comprises a relay lens which receives an illuminating beam and is optically aligned with an entering and an exiting lens fixed in the opposite walls of the sampling accessory, and designed such that the sampling accessory may be used both with and without liquid in the sample compartment but in either case not requiring a change in the optical system.

BACKGROUND OF THE INVENTION

This invention relates to an optical system generally and more particularly relates to a special lens system designed for the multiple sampling accessory which is used in tandem with a spectrophotometer.

The sampling of a test specimen in a spectrophotometer as well as the type of equipment best utilized for such sampling is best understood by referring to the application entitled Multiple Sampling Accessory for Spectrophotometer, Ser. No. 654,260, filed by one Maurice L. Brown, July 18, 1967, and assigned to the same assignee as this present application and further relates to the patent application of D. D. Harmon et al, Ser. No. 538,743, filed Mar. 30, 1966, also assigned to the same assignee.

Sampling accessories for spectrophotometers, colorimeters and the like fall into two general classes, the first, a liquid bath type and the second, a non-water bath type or non-liquid.

In the first type, the water bath sampling accessory, a test tube containing the test specimen is inserted in the sampling accessory and is surrounded by circulating water of substantially constant temperature. By use of the circulating water bath, some assurance is had that the temperature of the test specimen will be held constant at a given temperature and that all test samplings will be taken at the same given temperature. A further reason for using the water bath is that less optical effect occurs whenever a test cell is sampled while surrounded by water than while surrounded by air. Since the change in index of refraction when the sampling light ray passes from the liquid to the glass in the test tube is much less than when passing from air to the glass, the use of a water bath is often preferred. Although reference is made to the "liquid" bath in certain places in the specification as a "water" bath, it should be understood that other transparent liquids may be used. The ideal index of refraction should ideally match that of the test tube or cuvette material, but water is often preferred.

From the above it follows that the water bath sampling system is therefore ideal when temperature control of the test specimen is critical to the analysis and in addition when minimum deviation effect on the optical beam is desired for the analysis.

The second type of optical system used in sampling accessories, the non-water bath type, is basically the same as the water bath type except the water bath is eliminated from the sampling apparatus. This system is used whenever temperature control is not critical to the analysis and where square cuvettes are used in place of the common round test tube as a means for holding the sample specimen. Such cuvettes are generally constructed to very close tolerances and therefore the effect of the sampling ray passing from the air to the glass is not deviated in such a critical manner that the analysis would be affected. Also in the non-water bath type of sampling operation, the forced use of a water bath would hinder the smooth operation of the sampling procedure and would not be desirable.

SUMMARY OF THE INVENTION

In order to overcome the problems inherent in the water bath and the non-water bath sampling accessory, I have provided a new and novel optical system which has been designed to be utilized in either type of sampling accessory.

The optical system of my invention has been designed to alleviate the problems inherent in the water bath system and in addition, the optical system of my design may be utilized in the same spectrophotometer using a non-water bath sampling accessory.

In order to provide a system that may be used both with and without a water bath, it has been found that the monochromator slit of the spectrophotometer should be imaged in or near the center of the test cell holder under conditions when water is present in the sampling accessory and in addition under conditions when water is absent from the sampling accessory. By imaging the monochromator slit in or near the center of the test cell holder it has been found that less residual lens affect is produced by the test cell at this point. In addition, the width of the sampling light beam or slit image is thereby held to a minimum which permits the use of micro cells and allows sampling of very small cell structures.

The physical configuration of my new and novel lens system is ideally a triplet lens assembly having special constructional data and configuration as hereinafter described, in combination with a pair of substantially identical lenses positioned opposite to each other symmetrically on the multiple sampling accessory or chamber. The latter pair of lenses will be called hereinafter the entering lens and the exiting lens with the entering lens together with the aforesaid triplet lens being designed to image the monochromator slit substantially at the center of the test cell regardless of whether water is used in the sampling accessory or not. This is accomplished by using an undeviating second lens surface having a radius equal to the distance from the inner lens face to the center of the test cell. In such a lens, all of the rays passing through the lens will pass through the second lens surface substantially normal to said inner surface and hence will undergo minimal deviation.

As a result, whether the sampling accessory contains water or not becomes unimportant since the presence or absence of water in a sampling accessory will have a minimum effect on the optical system.

Accordingly, it is an object of my invention to provide a new and novel optical system of the type that may be utilized in a spectrophotometer or the like and one on which the presence or absence of liquid in the sampling accessory compartment will have little or no effect on the optical system.

Another object of my invention is to provide a new and novel optical system that may be adapted to spectrophotometers or the like and one which will allow greater flexibility in the operation of the spectrophotometer sampling system.

These and other objects and advantages will be found in the novel details of construction, combinations and arrangements of the parts of my invention by referring to the specification herebelow and the accompanying drawing.

BRIEF DESCRIPTION OF THE DRAWING

FIG. 1 is partly an elevational view of FIG. 2 together with an optical diagram including the spectrometer slit, and FIG. 2 is an optical diagram of the various components of my lens system and partly a plan viewing of the accessory showing their relationship to each other and their relationship to the sampling accessory of a spectrophotometer.

DESCRIPTION OF THE PREFERRED EMBODIMENT

The optical system of my design is designated 10 in the drawing wherein there is shown a triplet relay lens assembly 11 composed of singlet lenses designated $L_1$, $L_2$, $L_3$ which work in combination with a pair of symmetrically arranged meniscus lenses $L_4$ and $L_5$.

The relay lens assembly 11 is corrected for ultraviolet as well as visible light and comprises a first double convex lens element $L_1$ having the radii $R_1$ and $R_2$ numbered from the left side and the axial thickness $t_1$. The second lens element $L_2$ of the relay lens assembly 11 is double concave and has radii $R_3$ and $R_4$ and an axial thickness $t_2$. The third lens element $L_3$ of the relay lens assembly 11 is double convex similar to $L_1$, and has the radii $R_5$ and $R_6$ and the axial thickness $t_3$ as shown in FIG. 2 of the drawing.

The first lens $L_1$ and the third lens $L_3$ are spaced the distances $S_1$ and $S_2$ from the middle lens $L_2$.

Spaced at an axial distance $S_3$ from the face of the lens $L_3$ is the first of a pair of similar meniscus lenses which confront each other and are hereinafter referred to as the entering lens $L_4$ and the exiting lens $L_5$. The radii of the refractive surfaces of the lens $L_4$ are designated $R_7$ and $R_8$ and the axial thickness $t_4$. This lens is spaced the distance $S_4$ from the center 12 of the test cell 13 contained in a multiple sampling accessory generally designated by numeral 14 of a spectrophotometer having only the exit slit S thereof shown.

Spaced at a distance $S_5$ from the same center 12 of the test cell is the exiting lens element $L_5$ having radii designated $R_9$ and $R_{10}$ and a thickness $t_5$.

The values for the constructional data for the foregoing lenses $L_1$ to $L_5$ are given substantially by referring to the following Table I wherein $t_1$ through $t_5$ represent lens axial thicknesses, $S_1$ to $S_5$ represent successive interlens spaces, $R_1$ through $R_{10}$ represent the successive radii of the respective lenses shown in FIG. 2 of the drawing, the minus (—) sign used with certain R values signifying that such a radius is concave toward the slit S, $n_D$ representing the refractive index of the optical material used in said lenses, and L represents the overall distance between lens $L_3$ and lens $L_5$.

TABLE I

| Lens | Radii | Thicknesses | Spaces | $n_D$ |
|---|---|---|---|---|
| $L_1$ | $R_1=.303$ L<br>$-R_2=.191$ L | $t_1=.0162$ L | | 1.4337 |
| | | | $S_1=.00231$ L | |
| $L_2$ | $-R_3=.177$ L<br>$R_4=.177$ L | $t_2=.00925$ L | | 1.4585 |
| | | | $S_2=.00231$ L | |
| $L_3$ | $R_5=.191$ L<br>$-R_6=.303$ L | $t_3=.0162$ L | | 1.4337 |
| | | | $S_3=.616$ L | |
| $L_4$ | $R_7=.140$ L<br>$R_8=.187$ L | $t_4=.0111$ L | | 1.4855 |
| | | | $S_4=.199$ L | |
| $L_5$ | $-R_9=.187$ L<br>$-R_{10}=.140$ L | $t_5=.0111$ L | | 1.4585 |
| | | | $S_5=.185$ L | |

More specifically the constructional data for the aforesaid optical system 10 is given in Table II herebelow wherein the values are given substantially in millimeters.

TABLE II

| Lens | Radii | Thicknesses | Spaces | $n_D$ |
|---|---|---|---|---|
| $L_1$ | $R_1=65.61$<br>$-R_2=41.31$ | $t_1=3.5$ | | 1.4337 |
| | | | $S_1=.5$ | |
| $L_2$ | $-R_3=38.37$<br>$R_4=38.37$ | $t_2=2.0$ | | 1.4585 |
| | | | $S_2=.5$ | |
| $L_3$ | $R_5=41.31$<br>$-R_6=65.61$ | $t_3=3.5$ | | 1.4337 |
| | | | $S_3=133$ | |
| $L_4$ | $R_7=30.30$<br>$R_8=40.55$ | $t_4=2.4$ | | 1.4585 |
| | | | $S_4=43$ | |
| $L_5$ | $-R_9=40.55$<br>$-R_{10}=30.30$ | $t_5=2.4$ | | 1.4585 |
| | | | $S_5=40$ | |

From the drawing, it will be noted that the entering lens $L_4$ has been designed to image the slit at the center of the test cell regardless of whether or not water is in the sampling apparatus. This is accomplished by the use of a meniscus lens having an inner radius $R_8$ approximately equal in magnitude to the distance from the inner face of the lens to the center of the test specimen holder. As a result, all of the rays that are deviated by the outer radius $R_7$ of the element $L_4$ pass through the second or inner lens surface substantially normal to the surface, and therefore undergo no deviation. It is recognized that since a finite light source instead of a point source is used herein; and also since there will be some image aberrations introduced by the radius $R_7$ all rays will not be strictly normal to $R_8$, in spite of the fact that they can be minimized to a point where they will not influence the desired result.

The same procedure holds true as the ray leaves the sampling accessory in passing through the existing lens $L_-$. This lens has been designed similar to the entering lens $L_4$ and has an inner radius $R_9$ approximately equal to the distance from the inner face of the lens element to the center of the test specimen holder. As a result, the exiting beam passes through the inner surface of this lens element, then being deviated onto the second surface of the lens element and is deviated appropriately to a photo cell or some other device by means of the radius $R_{10}$ which is normally of different radius than $R_9$.

From the foregoing it can be seen that I have provided a new and novel type multiple sampling accessory designed for a spectrophotometer or the like wherein a water bath may be utilized in the sampling procedure.

In addition, the same optical system may be utilized without a water bath while having little effect on the optical system. From this, it can be seen that the flexibility of such an optical system in the range of utilization of such a sampling accessory is very wide and heretofore unknown.

From the foregoing it will be observed that I have provided the means and construction for accomplishing all of the objects and advantages of my invention. Nevertheless, it is apparent that many changes may be made in the details of construction, arrangement of parts, without departing from the spirit and scope of the invention as expressed in the accompanying claims and the invention is not to be limited to the exact manner shown and described as only the preferred matters and constructions have been given by way of illustration only.

I claim:

1. A lens system for a spectrophotometric sampling apparatus having a light transmitting container wherein a sample to be tested is held, said system projecting a light beam from an illuminated slit mechanism substantially through the center of said container, said system being characterized by the combination of a relay lens which is optically aligned on an optical axis between said slit and said container to project a light beam from said slit near the central portion of said sample, said lens converging said light beam toward said portion, an entrance lens optically aligned on said axis and mounted in said apparatus at a fixed distance from said portion of the sample, the inner lens surface thereof being concentric about a point on said axis within said portion, and photodetector means located within the beam which exits said sample to indicate the transmittance thereof.

2. A lens system for a spectophotometric sampling apparatus having a light transmitting container wherein a sample to be tested is held, said system projecting a beam from an illuminated slit mechanism substantially through the center of said container, said system being characterized by the combination of a relay lens which is optically aligned on an optical axis between said slit and said container to project a light beam from said slit near the central portion of said sample, said lens passing converging light from said relay lens toward said portion, an entrance lens optically aligned on said axis and mounted in said apparatus at a fixed distance from said portion of the sample, the inner surface thereof being concentric about a point on said axis within said portion, an exit lens located within the fan of rays which are transmitted through said sample, said exit lens being constructed through said sample, said exit lens being constructed to concentrate said rays at an axial location rearwardly thereof, and photodetector means positioned to receive said rays and indicate thereby the transmittance of the sample.

3. A lens system for a spectrophotometric sampling apparatus having a transparent member in which a liquid body is held, said system projecting a beam from an illuminated slit mechanism to said member and comprising a collective relay lens which is corrected for ultraviolet as well as visible light and is optically aligned between said slit mechanism and said member to project a light beam from said slit mechanism through the center of said body, said lens receiving the light from said slit, a pair of meniscus lenses aligned symmetrically and concave to each other on said axis on opposite sides of the center of the liquid body, the radii of the concave surfaces meeting at said center, said lenses forming part of said chamber, the beam being focused jointly by the relay lens and the front meniscus lens at said center, and a photodetector cell located on said axis external to said chamber in optical alignment with the second of said pair of lenses in position to receive said beam.

4. A lens system for use in a multiple liquid sample testing apparatus having a conditioning chamber for the transparent containers which hold each liquid sample, said system projecting a beam from an illuminated slit through the center of said container and sample to a photodetector device, said system comprising a relay lens optically aligned exteriorally of said chamber on an axis extending through said slit and the center of said container, and receiving light from said slit, and a first and a second positive meniscus lens secured coaxially with the relay lens in openings in the opposite walls of said chamber, the concave sides thereof facing each other, the beam from said relay lens being received by said first meniscus lens which forms a conjugate image of the slit at said center, the radii of the concave surfaces meeting at said center;

the equivalent focal length of said first meniscus lens being substantially 1.11L, the equivalent focal length of said relay lens being substantially .448L, and the axial distance between these lenses being substantially .61L wherein L represents the axial distance between said relay lens and the concave surface of the second meniscus lens.

5. A lens system for use in a sample testing apparatus as set forth in claim 2 wherein the radii of the two confronting concave lens surfaces of said meniscus lenses are equal.

6. A lens system for use in a liquid sample testing apparatus as set forth in claim 2 wherein said relay lens is a triplet lens and comprises a front and a rear double convex lens element designated $L_1$ and $L_3$ respectively and therebetween is spaced a double concave lens element designated $L_2$, the axial airspaces between $L_1$ and $L_2$ and between $L_2$ and $L_3$ being designated $S_1$ and $S_2$, the constructional data for said system being given substantially in terms of L in the table below wherein $R_1$ to $-R_{10}$ represent the radii of the successive lens surfaces numbering from the side toward the slit and the minus (—) sign used with certain R values means that such a surface is concave toward the slit, $S_3$ represents the axial distance between said triplet lens and lens $L_4$, $S_4$ represents the axial from the outer surface of lens $L_4$ to the center and $S_5$ represent the axial distance from lens $L_5$ to said center, and $n_D$ represents the refractive index of the glass used in the system, the values thereof being numerical, the symbol L representing the axial distance between said relay lens and the concave surface of the second meniscus lens,

TABLE

| Lens | Radii | Thicknesses | Spaces | $n_D$ |
|---|---|---|---|---|
| $L_1$ | $R_1=.303$ L<br>$-R_2=.191$ L | $t_1=.0162$ L | $S_1=.00231$ L | 1.4337 |
| $L_2$ | $-R_3=.177$ L<br>$R_4=.177$ L | $t_2=.00925$ L | $S_2=.00231$ L | 1.4585 |
| $L_3$ | $R_5=.191$ L<br>$-R_6=.303$ L | $t_3=.0162$ L | $S_3=.616$ L | 1.4337 |
| $L_4$ | $R_7=.140$ L<br>$R_8=.187$ L | $t_4=.0111$ L | $S_4=.199$ L | 1.4585 |
| $L_5$ | $-R_9=.187$ L<br>$-R_{10}=.140$ L | $t_5=.0111$ L | $S_5=.199$ L | 1.4585 |

(References on following page)

References Cited

UNITED STATES PATENTS 2,810,315 10/1957 Miller.
3,022,704 2/1962 Cary.

FOREIGN PATENTS 675,911 6/1939 Germany.

RONALD L. WIBERT, Primary Examiner
T. MAJOR, Assistant Examiner

U.S. Cl. X.R.

350—8, 220, 226; 356—246

PO-1050
(5/69)

UNITED STATES PATENT OFFICE
CERTIFICATE OF CORRECTION

Patent No. 3,523,738     Dated August 11, 1970

Inventor(s) JAMES J. CHISHOLM

It is certified that error appears in the above-identified patent and that said Letters Patent are hereby corrected as shown below:

Col. 4, line 62, change "existing" to -- exiting --;
       line 63, change "L-" to -- $L_5$ --

MAR. 2, 1971

(SEAL)
Attest:

Edward M. Fletcher, Jr.
Attesting Officer

WILLIAM E. SCHUYLER, JR.
Commissioner of Patents